(12) United States Patent
Mori

(10) Patent No.: US 7,801,013 B2
(45) Date of Patent: Sep. 21, 2010

(54) OPTICAL PICKUP APPARATUS

(75) Inventor: Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 318 days.

(21) Appl. No.: 12/152,313

(22) Filed: May 14, 2008

(65) Prior Publication Data
US 2008/0285424 A1 Nov. 20, 2008

(30) Foreign Application Priority Data
May 18, 2007 (JP) .............................. 2007-133162

(51) Int. Cl.
*G11B 7/00* (2006.01)
(52) U.S. Cl. ............................. 369/112.23; 369/112.24; 369/44.23; 369/44.14; 369/44.32
(58) Field of Classification Search ........................ None
See application file for complete search history.

(56) References Cited
U.S. PATENT DOCUMENTS 5,247,503 A * 9/1993 Nomiyama et al. ...... 369/44.35
7,283,286 B2 * 10/2007 Fukumoto et al. ........... 369/103

FOREIGN PATENT DOCUMENTS
JP 2005-293777 10/2005

* cited by examiner

*Primary Examiner*—Muhammad N. Edun
(74) *Attorney, Agent, or Firm*—Cohen Pontani Lieberman & Pavane LLP

(57) ABSTRACT

An optical pickup apparatus is provided for recording and/or reproducing information on an optical disc in which information can be recorded at recording positions. The optical pickup apparatus includes: a light source; a relay optical system; an objective lens for converging a light flux onto one of the plurality of recording positions; a photodetector for receiving a light flux from the optical disc; a detector; a first actuator; and a second actuator. The detector is provided for detecting information for keeping a distance between the optical disc and the objective lens a predetermined value. The first actuator is provided for driving the objective lens for keeping the distance between the optical disc and the objective lens the predetermined value. The second actuator is provided for driving the relay optical system corresponding to one of the plurality of recording positions where information is recorded and/or reproduced.

11 Claims, 8 Drawing Sheets

OPTICAL PICKUP APPARATUS

This application is based on Japanese Patent Application No. 2007-133162 filed on May 18, 2007, in Japanese Patent Office, the entire content of which is hereby incorporated by reference.

TECHNICAL FIELD

The present invention relates to an optical pickup apparatus and an optical disc apparatus, which can record and/or reproduce information on an optical disc.

BACKGROUND

There has been a rapid advancement of research and development of a high density optical disc system capable of recording and/or reproducing (hereinafter, "recording and/or reproducing" will be described as "recording/reproducing") information by using a violet semiconductor laser with a wavelength of about 400 nm. An example of the high density optical disc system records/reproduces information with specifications of NA 0.65 and light source wavelength of 405 nm to an optical disc, so-called HD DVD (hereinafter referred to as HD). In the system, information of about 15 GB per layer can be recorded for the optical disc having a diameter of 12 cm. Another example of the high density optical disc system records/reproduces information with specifications of NA 0.85 and light source wavelength of 405 nm for an optical disc, so-called Blu-ray Disc (hereinafter referred to as BD). In the system, information of about 25 GB per layer can be recorded for the optical disc having a diameter of 12 cm. Hereinafter, these optical discs will be referred as a "high density optical disc" in the present specification.

In order to achieve further increase of the storage capacity, the optical disc which provides a plurality of storage layers has been developed. In such an optical disc, the plurality of storage layers stores information which indicating the number of each layer, in advance. Therefore, the optical pickup apparatus for this kind of optical disc reads this information in an optical disc to select the recoding layer where information is recorded and/or reproduced, and moves an element such as a collimating lens to converge a light flux from a light source onto this recording layer, as disclosed in Unexamined Japanese Patent Application Publication No. 2005-293777.

When a vibration is given to the optical pickup apparatus and the collimator lens moves doe to the vibration, a light flux from the light source will be converged onto another recording layer, and there is a possibility that record/reproduction error may arise.

SUMMARY

The present invention has been achieved in view of the above problem, and an object of the present invention is to provide an optical pickup apparatus, which can record and/or reproduce information with sufficient precision onto or from an optical disc in which information can be recorded on two or more recoding positions each of which is located at different distance from the surface of the optical disc.

An embodiment of the present invention is an optical pickup apparatus for recording and/or reproducing information on an optical disc in which information can be recorded at a plurality of recording positions each of which is located at a different distance from a surface of the optical disc. The optical pickup apparatus comprises: a light source; a relay optical system; an objective lens; a photodetector; and a detector for detecting information for keeping a distance between the optical disc and the objective lens a predetermined value. The objective lens receives the light flux emitted from the light source through the relay optical system and converges the light flux onto one of the plurality of recording positions. The photodetector receives a light flux from the optical disc. The optical pickup apparatus further comprises a first actuator for driving the objective lens for keeping the distance between the optical disc and the objective lens the predetermined value irrespective of the plurality of recording positions; and a second actuator for driving the relay optical system corresponding to one of the plurality of recording positions where information is recorded and/or reproduced.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
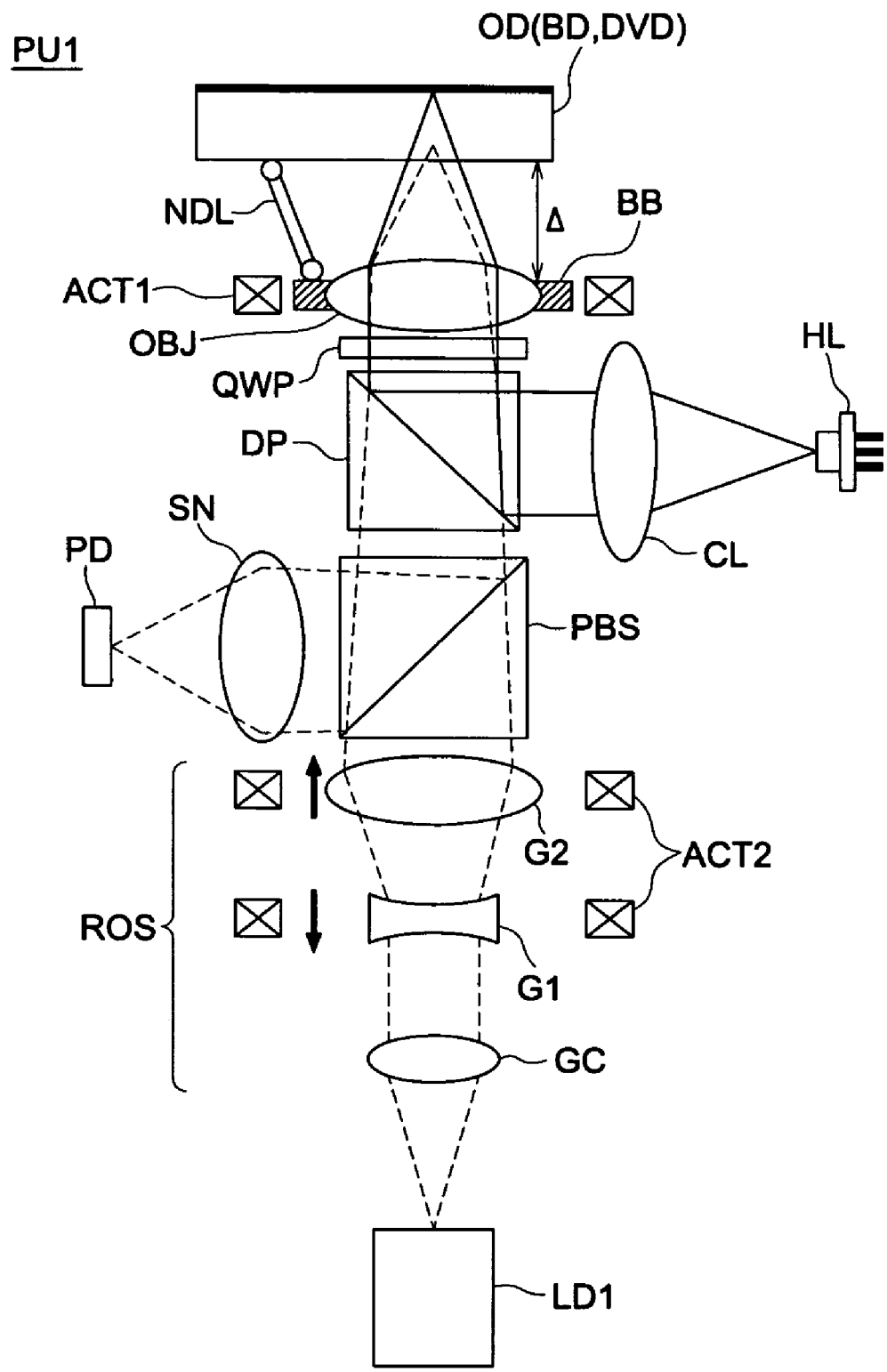
FIG. 1 illustrates a schematic view of the structure of an optical pickup apparatus PU1.

Hereinafter, preferable embodiments related to the present invention will be explained.

A preferred embodiment related to the present invention is an optical pickup apparatus for recording and/or reproducing information on an optical disc in which information can be recorded at a plurality of recording positions each of which is located at a different distance from a surface of the optical disc. The optical pickup apparatus comprises: a light source for emitting a light flux; a relay optical system for receiving the light flux emitted from the light source; and an objective lens for receiving the light flux emitted from the light source through the relay optical system and converging the light flux onto one of the plurality of recording positions. The optical pickup apparatus further comprises: a photodetector for receiving a light flux emitted from the optical disc; and a detector for detecting information for keeping a distance between the optical disc and the objective lens a predetermined value. The optical pickup apparatus further comprises: a first actuator for driving the objective lens so as to displace the objective lens in a direction of an optical axis of the objective lens based on a signal from the detector, for keeping the distance between the optical disc and the objective lens the predetermined value irrespective of the plurality of recording positions; and a second actuator for driving the relay optical system so as to displace the relay optical system in a direction of an optical axis of the relay optical system, corresponding to one of the plurality of recording positions where information is recorded and/or reproduced.

According to the above structure, the detector detects information for keeping the distance between the optical disc and the objective lens constant, and the first actuator drives the objective lens in the direction of an optical axis based on the signal from the detector so that distance to the optical disc may be maintained to the predefined value. Therefore, for example, even in cases where disturbance such as vibration arises, the positional relation in the optical-axis direction between an optical disc and the objective lens can be maintained. Furthermore, the second actuator displaces the relay optical system in the direction of the optical axis corresponding to the recording position of the optical disc where information is to be recorded and/or reproduced. Therefore, a light flux from the light source can be converged onto the aimed recording position with sufficient precision, and record/reproduction error can be controlled.

When changing the recording position of the optical disc where information is to be recorded and/or reproduced, the convergent position of the light flux from the light source can also be changed by displacing the objective lens in the direction of an optical axis. However, when the objective lens is displaced in the direction of the optical axis, it sometimes causes an interference with an objective lens and an optical disc depending on the case, which it is not desirable. On the other hand, when displacing the relay optical system as the above structure, the objective lens and the optical disc usually keep the predetermined positional relationship. It does not cause the interference with the objective lens and the optical disc, and information can be recorded and/or reproduced stably.

The actuator generally used with optical pickup apparatus can be used as the first actuator and the second actuator. A voice coil motor can be used for the first actuator as an example. A stepping motor can be used for the second actuator as an example.

In the optical pickup apparatus, the detector can mechanically detect the information for keeping the distance between the optical disc and the objective lens the predetermined value.

Alternatively, in the optical pickup apparatus, the detector can optically detect the information for keeping the distance between the optical disc and the objective lens the predetermined value.

In the optical pickup apparatus, the relay optical system can comprise a single lens group or a plurality of lens groups, and the second actuator can drive a lens group arranged closest to the objective lens in the relay optical system in the direction of the optical axis of the relay optical system, corresponding to one of the plurality of recording positions where information is recorded and/or reproduced.

The above optical pickup apparatus preferably satisfies the following expression (1).

$$0.005 < (f0/f2)^2 < 0.25 \tag{1}$$

In the expression (1), f0 is a focal length of the objective lens, and f2 is a focal length of the lens group arranged closest to the objective lens.

When the value $(f0/f2)^2$ is set less than the maximum limit of the expression (1), a change amount in the optical axis direction of the light-converged position in the optical disc can be suppressed small compared with the displacement amount of the above lens group. It allows the optical pickup apparatus to converging a light flux with high precision. On the other hand, when the value $(f0/f2)^2$ exceeds the minimum limit of the expression (1), the relay optical system can be structured compact.

In the optical pickup apparatus, the relay optical system can comprise, in order from the light source side, a collimating lens group having a positive refractive power for converting an incident light flux into a parallel light flux, a first lens group, and a second lens group having an opposite refractive power to the first lens group. In the optical pickup apparatus, the second actuator can move the first lens group in a direction such that the first lens group goes away from the objective lens to change a recording position in a direction from a rear side to a front side of the optical disc, when the second actuator move only the first lens group in the relay optical system in the direction of the optical axis of the relay optical system. In the optical pickup apparatus, the second actuator can move the second lens group in a direction such that the second lens group goes closer to the objective lens to change a recording position in a direction from the rear side to the front side of the optical disc, when the second actuator moves only the second lens group in the relay optical system in the direction of the optical axis of the relay optical system.

The optical pickup apparatus preferably satisfies the following expression (2).

$$0.005 < (f0/f2)^2 < 0.25 \tag{2}$$

In the expression (2), f0 is a focal length of the objective lens, and f2 is a focal length of the lens group arranged closest to the objective lens.

When the value $(f0/f2)^2$ is set less than the maximum limit of the expression (2), a change amount in the optical axis direction of the light-converged position in the optical disc can be suppressed small compared with the displacement amount of the above lens group. It allows the optical pickup apparatus to converging a light flux with high precision. On the other hand, when the value $(f0/f2)^2$ exceeds the minimum limit of the expression (2), the relay optical system can be structured compact.

In the optical pickup apparatus, the first lens group can have a negative refractive power, and the second lens group can have a positive refractive power. In the structure, an air-equivalent length between a first principal point of the objective lens and a second principal point of the second lens group is almost f0+f2, where the air-equivalent length is obtained by substituting an air space for a whole of optical elements arranged between the first principal point of the objective lens and the second principal point of the second lens group, and f0 is a focal length of the objective lens, and f2 is a focal length of the lens group arranged closest to the objective lens. Further, the second actuator can move only the first lens group in the relay optical system in the direction of the optical axis of the relay optical system for recording and/or reproducing information.

According to the above structure, the magnification of the whole system from the light source to the optical disc is maintained even when the light-converged position in the optical disc is displaced in the optical-axis direction by displacing of the first lens group. Therefore, NA at the converged spot side which is defined by a divergent angle of a light flux emitted from the light source, does not change. It maintains a light-intensity and size of a spot constant, without adjustment of the light amount of the light source, and performs accurate recording and/or reproducing of information easily.

Here, "air-equivalent length is almost f0+f2" means that the air-equivalent length is not more than ±5% of f0+f2. It preferably means that the air-equivalent length is not more than ±2% of f0+f2.

In the optical pickup apparatus, the second actuator can drive the relay optical system so as to displace the relay optical system in the direction of the optical axis of the relay optical system, corresponding to one of the plurality of recording positions where information is recorded and/or reproduced. Further, when information is recorded and/or reproduced on one of the plurality of recording positions, the first actuator can drive the objective lens so as to displace the objective lens in the direction of the optical axis of the objective lens based on the signal from the detector for keeping the distance between the optical disc and the objective lens the predetermined value, and the second actuator can further drives finely the relay optical system to displace the relay optical system in the optical axis of the relay optical system so as to track the objective lens based on a displacement amount of the objective lens and a displacement amount of the relay optical system by the second actuator corresponding to one of the plurality of recording positions. Here, "the second actuator can finely drive the relay optical system" means that the second actuator drives the relay optical system so that a displacement amount of the relay optical system based on the displacement amount of the objective lens and on the displacement amount of the relay optical system corresponding to one of the plurality of recording positions, becomes smaller than a displacement amount of the relay optical system corresponding to one of the plurality of recording positions.

When the objective lens is displaced in the direction of the optical axis due to a warp of an optical disc, the optical pickup apparatus employing the above structure can record and/or reproduce information more accurately by adjusting a displacement amount of the relay optical system in the optical axis, based on the displaced amount of the second actuator and the displacement amount of the objective lens.

As the second actuator in this structure, a voice coil motor is preferably employed.

In the above optical pickup apparatus, the second actuator can finely drive the relay optical system with being accompanied by a movement of the objective lens, so as to displace the relay optical system by a amount which is proportional to a square of a displacement amount of the relay optical system for changing the recording positions compared with a position of the relay optical system for recording information on a predetermined standard recording position and is proportional to the displacement amount of the objective lens compared with a position of the objective lens for recording information on the predetermined standard recording position. Accordingly, the optical pickup apparatus can record and/or reproduce information in higher accuracy.

According to the above structures, for the optical disc which can record information onto recording positions each arranged at a different distance from the surface of the optical disc, the optical pickup apparatus can record and/or reproduce information with sufficient accuracy to two or more recording positions.

Hereinafter, embodiments of the present invention will be described by using drawings. Optical pickup apparatus PU1 relating to the first embodiment can record and/or reproduce information on or from, for example, BD (or HD may be applicable) and DVD. In BD, information can be recorded at a plurality of recording positions each of which is located at a different distance from the surface of the optical disc, and DVD. The optical pickup apparatus PU1 can be included in an optical disc apparatus. FIG. 1 shows a schematic view of the structure of an optical pickup apparatus PU1. In addition, optical discs are named generically as OD in the drawings.

In optical pickup apparatus PU1 illustrated in FIG. 1, movable-type sensing needle NDL whose front edge is arranged to contact the surface of the optical disc OD is disposed on bobbin BB holding objective lens OBJ. By measuring the movement amount of the sensing needle NDL, the signal corresponding to the distance between the surface of the optical disc OD and the bobbin BB, i.e., an objective lens OBJ, can be outputted. The sensing needle NDL configures a mechanical detector. According to the signal based on detection of the sensing needle NDL, first actuator ACT drives the bobbin BB to displace the bobbin in the direction of the optical axis by to always keep the reference distance Δ between the surface of the optical disc OD and the objective lens OBJ a predetermined value.

In the present embodiment, the relay optical system ROS includes collimator lens GC, lens group G1 having a negative refractive power, and second lens group G2 having a positive refractive power, in order from semiconductor laser LD1 side. Here, the second actuator ACT2 drives the second lens group G2 so as to displace the second lens group in the direction of an optical axis. The optical pickup apparatus PU1 satisfies the following expression (1).

$$0.005 < (f0/f2)^2 < 0.25 \qquad (1)$$

In the expression (1), f0 is a focal length of the objective lens OBJ, and f2 is a focal length of the lens group G2 closest to the objective lens.

When recording/reproducing information onto or from the first recording position at a predetermined distance from the surface of BD, the second actuator ACT2 displaces the second lens group G2 of the relay optical system ROS to a predetermined position along the optical axis, and semiconductor laser LD1 emits light. A divergent light flux from the semiconductor laser LD1 enters collimator lens GC to be converted into a parallel light flux. Then, the light flux becomes a divergent light flux after passing through the first lens group G1. The light flux further passes through the second lens group G2 to be converted into a weakly convergent light flux. The light flux further passes through a polarized beam splitter PBS, a dichroic prism DP and a quarter-wave plate QWP and enters the objective lens OBJ to become a spot formed on the first recording position at the predetermined distance from the surface of BD.

The light flux is reflected by BD and passes through the objective lens OBJ, the quarter-wave plate QWP, and the dichroic prism DP again. Then, the light flux is reflected by the polarized beam splitter PBS, and enters photodetector PD through sensor lens SN. With the output of the photodetector PD, the information recorded on the first recording position of BD can be read.

Next, When recording/reproducing information onto or from the second recording position whose position from the surface becomes shallower (alternatively, deeper) than the predetermined distance in BD, that is, the recording position changes in a direction from a rear side to a front side of the optical disc (alternatively, from the front side to the rear side), the second actuator ACT2 displaces the second lens group G2 of the relay optical system ROS from the predetermined position on the optical axis in the direction that the second lens group goes closer to (goes away from) the objective lens OBJ, and the semiconductor laser LD1 emits light. A divergent light flux from the semiconductor laser LD1 enters the collimator lens GC to be converted into a parallel light flux. Then, it becomes a divergent light flux by passing through the first lens group G1. The light flux passes the second lens group G2 to be converted into a weak convergent light flux, and passes the polarized beam splitter PBS, the dichroic prism DP, and the quarter-wave plate QWP. Then, light flux passes the objective lens OBJ to become a spot formed onto the second recording position at the predetermined distance from the surface of BD.

The light flux is reflected by BD and passes through the objective lens OBJ, the quarter-wave plates QWP and dichroic prism DP again. Then, the light flux is reflected by the polarized beam splitter PBS, and the reflected light flux from BD enters photodetector PD through the sensor lens SN. With the output of the photodetector PD, the information recorded on the second recording position of BD can be read.

When the second actuator ACT2 drives the first lens group G1 in the first embodiment, the second actuator ATC2 displaces the first lens group G1 from the predetermined position on the optical axis in the direction that the first lens group goes away from (alternatively, goes closer to) the objective lens OBJ, for recording/reproducing information onto or from the second recording position whose distance from the surface is shallower (alternatively, deeper) than the predetermined distance in BD, that is, the position changes in a direction from the rear side to the front side of the optical disc.

When recording/reproducing information onto or from DVD, the semiconductor laser in hologram laser HL is arranged to emit light. A divergent light flux emitted from the hologram laser HL enters the collimating lens CL to be converted into a parallel light flux after, and is reflected by the diachronic prism DP. Then, the light flux passes through the quarter-wave plate QWP and enters the objective lens OBJ to become a spot formed on the information recording surface of DVD.

The light flux is reflected by the information recording surface of DVD and passes through the objective lens OBJ and the quarter-wave plate QWP again. The light flux is reflected by the dichroic prism DP and further reflected by the polarized beam splitter PBS. Then, the light flux enters the photodetector in the hologram laser through the collimating lens CL. With the output of this photodetector, the information recorded on the information recording surface of DVD can be read.

According to the first embodiment, the detector detects information for keeping the distance between the surface of the optical disc OD and the objective lens OBJ a predetermined value and the first actuator ACT1 drives the objective lens OBJ in the direction of the optical axis based on the signal from the detector so that the distance from the surface of the optical disc OD may be maintained to a predetermined value. Therefore, the distance between the surface of the optical disc OD and the objective lens OBJ can always be set in a constant distance. Furthermore, the second actuator ACT2 displaces the relay optical system ROS in the direction of the optical axis according to the recording position of the optical disc OD where information is to be recorded and/or reproduced. Therefore, the light flux from the light source can be converged onto an aimed recording position with a sufficient precision. Thereby, record/reproduction error can be controlled.

Figure 2:
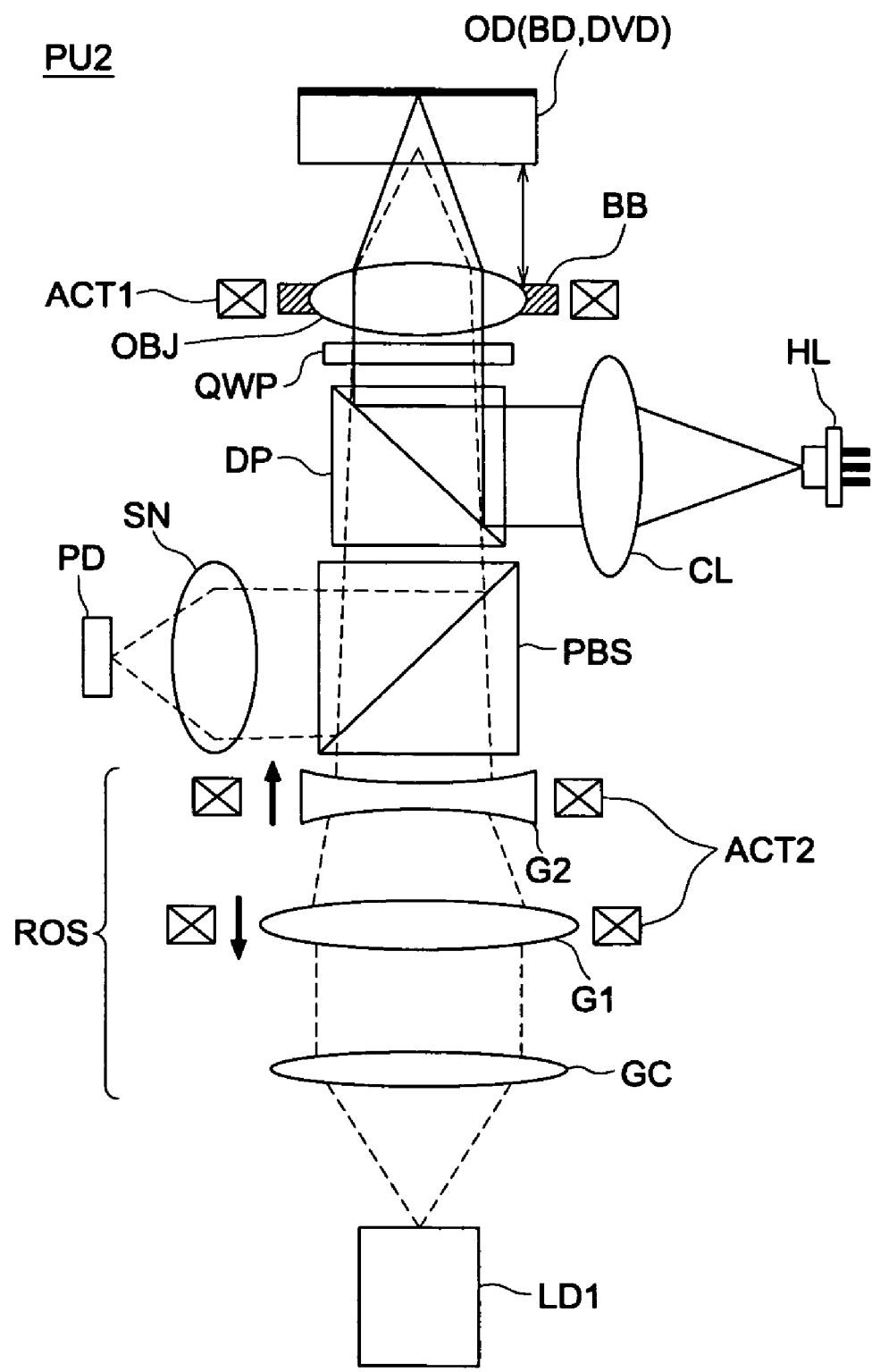
FIG. 2 illustrates a schematic view of the structure of an optical pickup apparatus PU2.

FIG. 2 shows a schematic view of the structure of optical pickup apparatus PU2 pertaining to the second embodiment. In the second embodiment, there is just a difference from the first embodiment only in relay optical system ROS in which a collimator lens GC, a first lens group G1 having a positive refractive power and a second lens group G2 having a negative refractive power are arranged in order from semiconductor laser LD1 side, therefore, the explanation for the first embodiment can be applied to the second embodiment without the difference.

Figure 3:
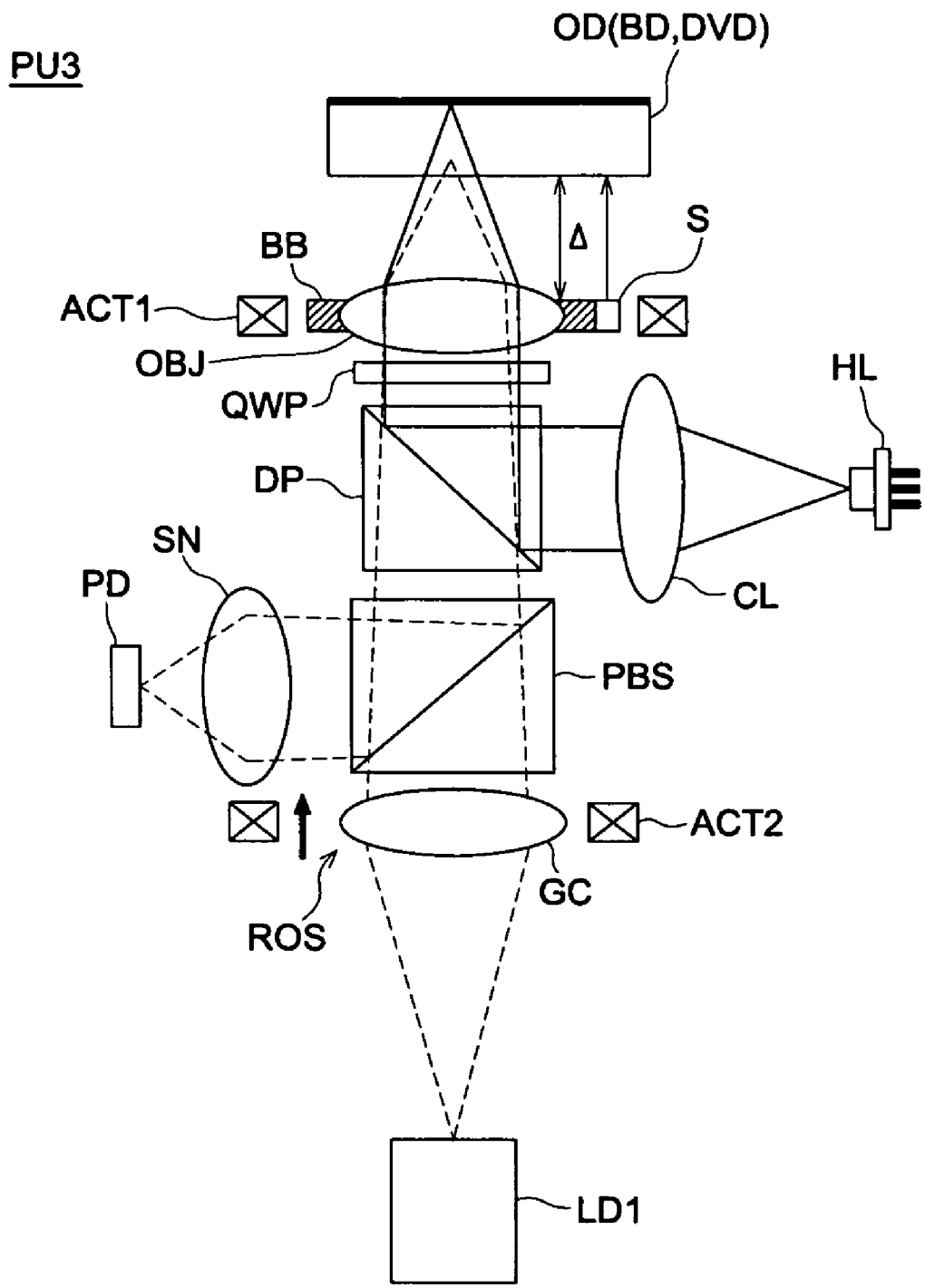
FIG. 3 illustrates a schematic view of the structure of an optical pickup apparatus PU3.

FIG. 3 shows a schematic view of the structure of optical pickup apparatus PU3 pertaining to the third embodiment. The relay optical system ROS is configured by only a collimating lens GC in the third embodiment. Further, sensor S is arranged in the bobbin BB. The sensor S emits a light flux toward the surface of the optical disc OD, and detects the reflected light. Thereby, the distance between the surface of the optical disc OD and the bobbin BB i.e., an objective lens OBJ, is measured, to output a corresponding signal. The sensor S configures an optical detector. According to the signal based on detection of the sensor S, the first actuator ACT1 drives the bobbin BB in the direction of the optical axis, to always keep the reference distance Δ between the surface of the optical disc OD and the objective lens OBJ constant.

When recording/reproducing information onto or from the first recording position at a predetermined distance from the surface of BD, the second actuator ACT2 displaces the collimator lens GC of the relay optical system ROS to a predetermined position along the optical axis, and the semiconductor laser LD1 emits light. A divergent light flux from the semiconductor laser LD1 enters the collimator lens GC to be converted into a parallel light flux. The light flux passes through the polarized beam splitter PBS, the dichroic prism DP and the quarter-wave plate QWP and enters the objective lens OBJ, to become a spot formed on the first recording position at a predetermined distance from the surface of BD.

The light flux is reflected by BD and passes through the objective lens OBJ, the quarter-wave plate QWP and dichroic prism DP again. Then, the light flux is reflected by the polarized beam splitter PBS, and enters the photodetector PD through the sensor lens SN. With the output of the photodetector PD, the information recorded on the first recording position of BD can be read.

Next, when recording/reproducing information onto or from the second recording position shallower (alternatively, deeper) than the predetermined distance from the surface of BD, that is, the position changes in a direction from the rear side to the front side of the optical disc (alternatively, from the front side to the rear side), the second actuator ACT2 displaces the collimator lens GC of the relay optical system ROS from the predetermined position on the optical axis in the direction which goes closer to (alternatively, goes away from) the objective lens OBJ from the predetermined position along the optical axis, and semiconductor laser LD1 is arranged to emit light. A divergent light flux from semiconductor laser LD1 enters the collimator lens GC, to be converted into a parallel light flux. The light flux passes the polarized beam splitter PBS, the dichroic prism DP, and the quarter-wave plate QWP and enters into the objective lens OBJ, to become a spot formed on the second recording position at a predetermined distance from the surface of BD.

The light flux is reflected light flux by BD and passes through the objective lens OBJ, the quarter-wave plate QWP and the dichroic prism DP again. The light flux is reflected by the polarized beam splitter PBS, and guided into the photodetector PD through the sensor lens SN. With the output of the photodetector PD, the information recorded on the second recording position from the surface of BD can be read.

For recording/reproducing information from or onto DVD, the optical pickup apparatus of the present embodiment performs as the same as that of the above embodiment.

Figure 4:
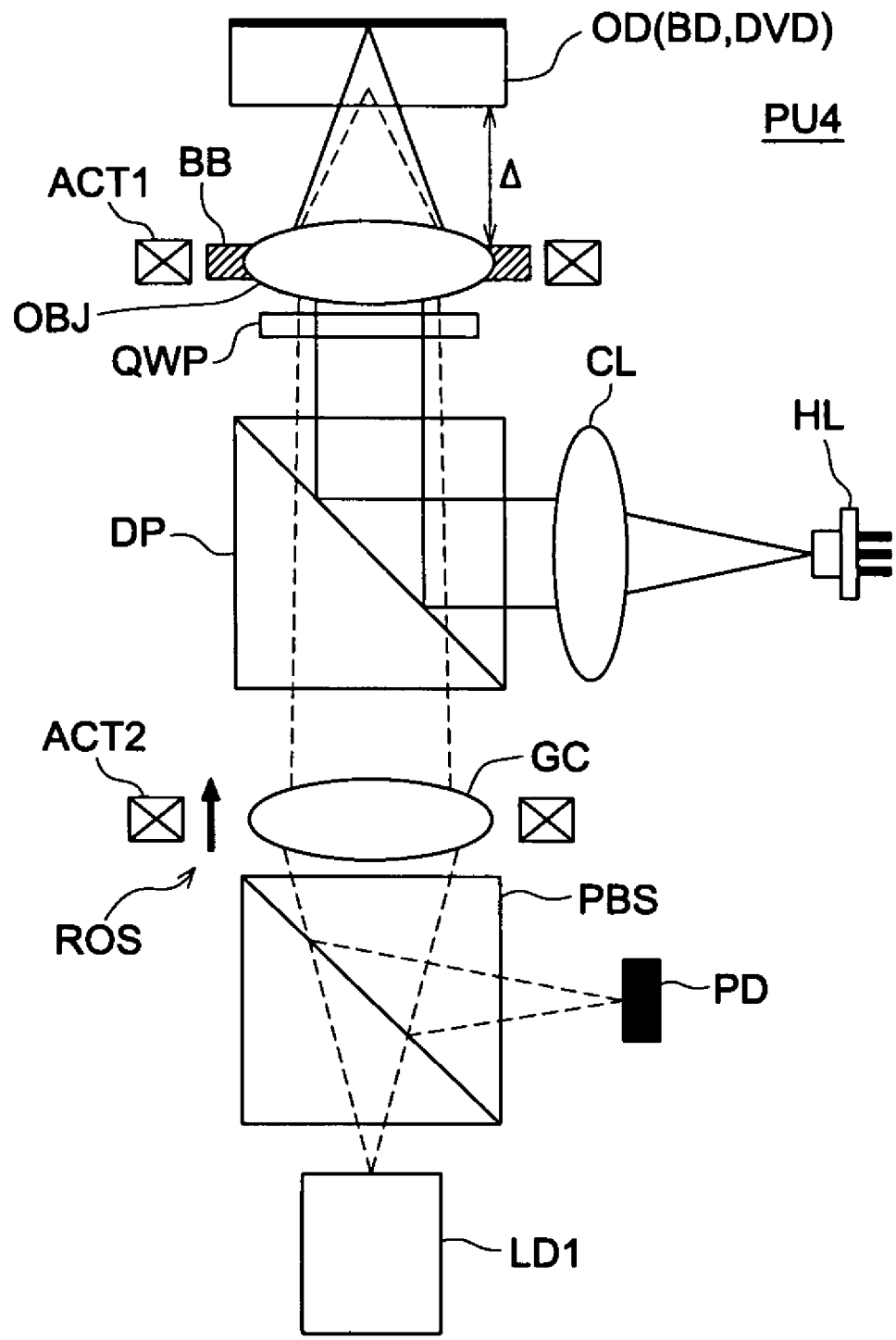
FIG. 4 illustrates a schematic view of the structure of an optical pickup apparatus PU4.

FIG. 4 shows a schematic view of the structure of an optical pickup apparatus PU4 pertaining to the fourth embodiment.

The fourth embodiment includes only a difference from the embodiment illustrated in FIG. 3 in that the polarized beam splitter PBS is provided between the collimating lens GC and the light source. Therefore, the explanation for the embodiment illustrated in FIG. 3 can be applied to the fourth embodiment.

Figure 5:
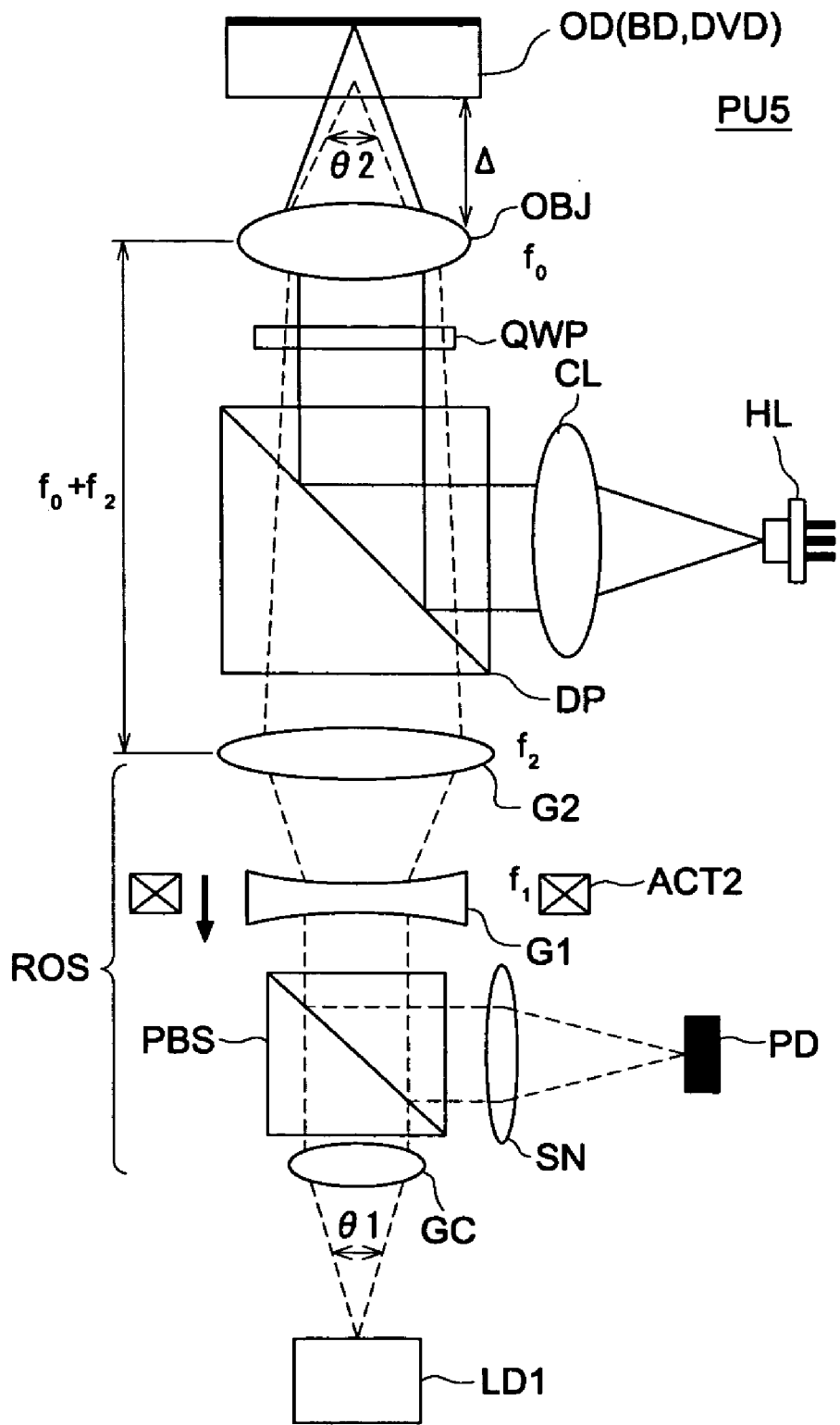
FIG. 5 illustrates a schematic view of the structure of an optical pickup apparatus PU5.

FIG. 5 shows a schematic view of the structure of optical pickup apparatus PU5 pertaining to the fifth embodiment. The detector and the first actuator which are not illustrated is provided with the optical pickup apparatus PU5. In the fifth embodiment, a difference from the layout of the embodiment illustrated in FIG. 1 is that the polarized beam splitter PBS is provided between the collimating lens GC and the first lens group G1. In this embodiment, defining that the first lens group G1 has a negative refractive power, the second lens group G2 has a positive refractive power, the focal length of the objective lens OBJ is set to f0 and the focal length of the second lens group G2 is set to f2, the air-equivalent length obtained by substituting air space for all the optical elements (the quarter-wave plate QWP and the dichroic prism DP in this embodiment) arranged between the first principal point of the objective lens OBJ and the second principal point of the second lens group G2 becomes the length which is substantially equal to f0+f2. The second actuator ACT2 drives the first lens group G1 in the direction of the optical axis.

When recording/reproducing information onto or from the first recording position at a predetermined distance from the surface of BD, the second actuator ACT2 displaces the first lens group G1 of the relay optical system ROS to the predetermined position along the optical axis, and semiconductor laser LD1 emits light. A divergent light flux (with divergent angle θ1) from the semiconductor laser LD1 enters the collimator lens GC, to be converted into a parallel light flux. The light flux passes through the polarized beam splitter PBS and the first lens group G1 to be converted into a divergent light flux. Then, the light flux passes through the second lens group G2 to be converted into a weak convergence light flux. The light flux passes the dichroic prism DP and the quarter-wave plate QWP, and enters the objective lens OBJ, to enter BD with the convergent angle of θ2. The light flux is formed into a spot on the first recording position of a predetermined distance from the surface of BD.

The light flux is reflected by BD and passes through the objective lens OBJ, the quarter-wave plates QWP, the dichroic prism DP, the second lens group G2 and the first lens group G1 again. Then, the light flux is reflected by the polarized beam splitter PBS, and is guided into the photodetector PD. With the output of photodetector PD, the information recorded on the first recording position of BD can be read.

Next, when recording/reproducing information onto or from the second recording position whose position from the surface becomes shallower (alternatively, deeper) than the predetermined distance in BD, that is, the position changes in a direction from a rear side to a front side of the optical disc (alternatively, from the front side to the rear side), the second actuator ACT2 displaces the second lens group G2 of the relay optical system ROS from the predetermined position on the optical axis in the direction that the second lens group goes away from (alternatively, goes closer to) the objective lens OBJ, and the semiconductor laser LD1 is arranged to emit light. A divergent light flux (divergent angle θ1') from the semiconductor laser LD1 is guided into the collimator lens GC to be converted into a parallel light flux. Then, the light flux is guided to the first lens group G2, to be shaped into a divergent light flux. The light flux passes through the second lens group G2 to become a weak convergence light flux. The light flux passes through the polarized beam splitter PBS, the dichroic prism DP and the quarter-wave plate QWP. The light flux enters the objective lens OBJ and further enters BD with a convergent angle of θ2'. The light flux passes the objective lens OBJ to become a spot formed onto the second recording position at a predetermined distance from the surface of BD.

The light flux is reflected from BD and passes trough the objective lens OBJ, the quarter-wave plate QWP and dichroic prism DP again. The light flux is reflected by the polarized beam splitter PBS and guided into the photodetector PD. With the output of the photodetector PD, the information recorded on the second recording position of BD can be read.

In the fifth embodiment, the portion which is configured by the objective lens OBJ and the second lens group G2, form an afocal system in which the angular magnification is a constant value of f2/f0. In addition, since the light flux collimated by the collimator lens GC enters into the first lens group G1, the divergent angle of the light flux emitted from the first lens group G1 and traveling toward the objective lens does not change due to the movement of the first lens group G1, and the divergent angle is a fixed multiple of the divergent angle θ1 of the divergent light flux from the semiconductor laser LD1. Thus, the ratio of the convergent angle of θ2 to the divergent angle θ1 is kept substantially constant by the movement of the first lens group G1, and (θ1/θ2)≈(θ1'/θ2') holds. Accordingly, NA at the side of the light-converged spot determined by the divergent angle of the light flux emitted from the semiconductor laser LD1 does not change. Therefore, the light intensity and the size of the spot can be maintained to a constant level, without adjusting a light amount of the semiconductor laser LD1. It allows the optical pickup apparatus of the embodiment to easily record and/or reproduce information with sufficient accuracy.

For recording/reproducing information onto or from DVD, the optical pickup apparatus performs the same as that of the embodiment described above.

Figure 6:
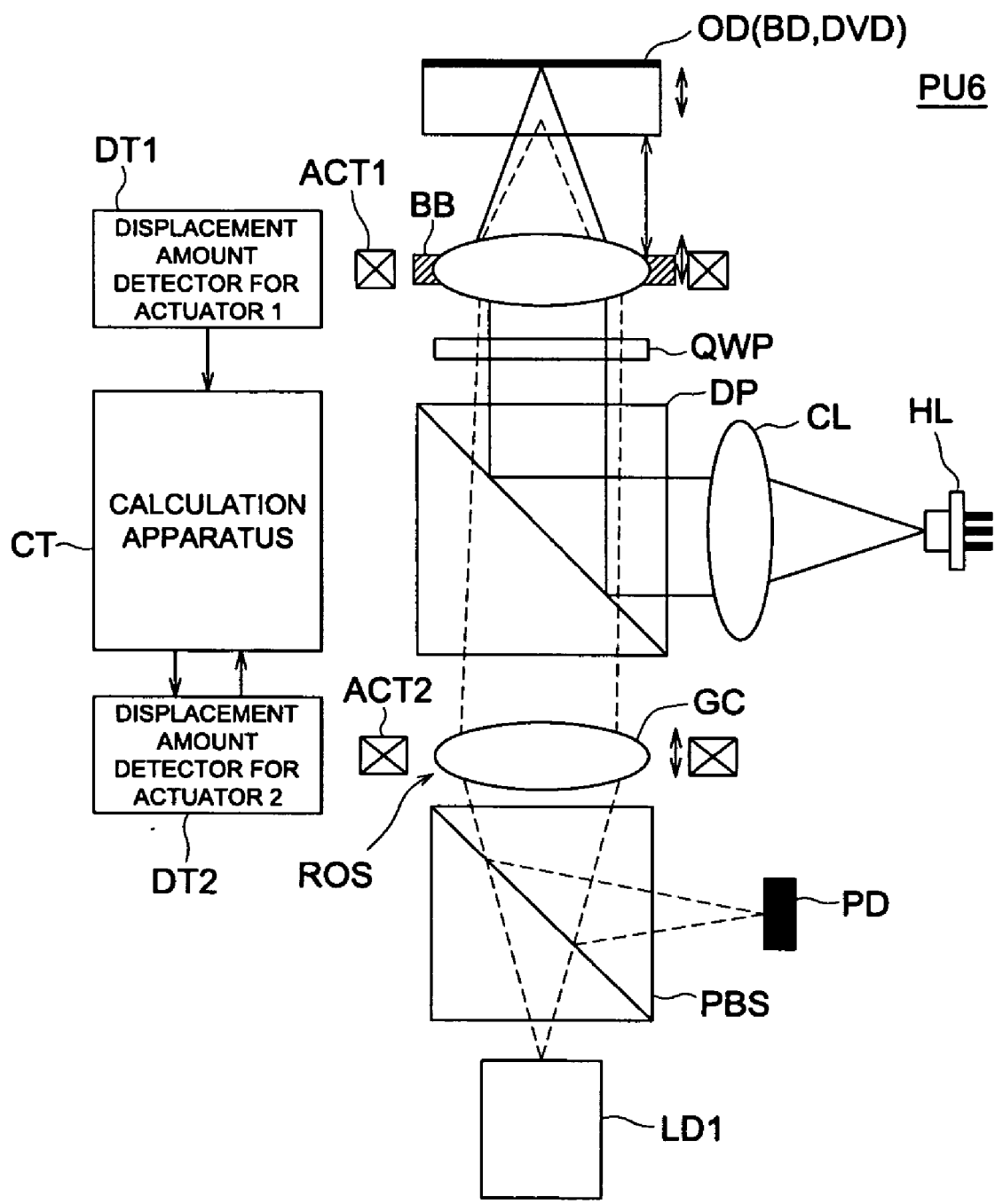
FIG. 6 illustrates a schematic view of the structure of an optical pickup apparatus PU6.

FIG. 6 shows a schematic view of the structure of an optical pickup apparatus PU6 pertaining to the sixth embodiment. The sixth embodiment is fundamentally the same as the layout of the embodiment illustrated in FIG. 4. However, the optical pickup apparatus PU6 includes a detector DT1, a calculation apparatus CT and a detector DT2. The detector DT1 detects the shift amount of the objective lens OBJ driven by the first actuator ACT1 compared with a predetermined standard position. The calculation apparatus CT determines the drive amount of the second actuator ACT2. The detector DT2 detects the displacement amount of a collimation lens CL driven by the second actuator ACT2.

At the time of rotation of BD, the position on the surface of BD is changed because of the warp of the optical disc. In this case, the first actuator ACT1 tends to displace the objective lens OBJ in the direction of the optical axis based on the signal from a detector, and tries to maintain the distance between the objective lens and the surface of the optical disc a predetermined value. However, when the objective lens OBJ is displaced independently in the direction of the optical axis, the distance of the objective lens OBJ from the relay optical system ROS changes. It causes a possibility of shifting a spot from the position onto which the spot supposed to be converged.

In this embodiment, the detector DT1 detects the displace amount of the objective lens OBJ driven by first actuator ACT1 compared with the standard position (the distance in the optical axis direction between the optical disc OD and the objective lens OBJ corresponds to the distance Δ). This shift amount is transmitted to the calculation apparatus CT. The detector DT2 detects the displacement amount of the relay optical system ROS positioned when information is recorded on one recording position compared with the relay optical system positioned when information is recorded onto the standard position. This displacement amount is transmitted to the calculation apparatus CT. The calculation apparatus CT receives these information and adjusts the displacement amount of the relay optical system in consideration of these displacement amounts. According to the adjusted drive amount, the relay optical system ROS is further displaced in the direction of the optical axis.

Figure 7:
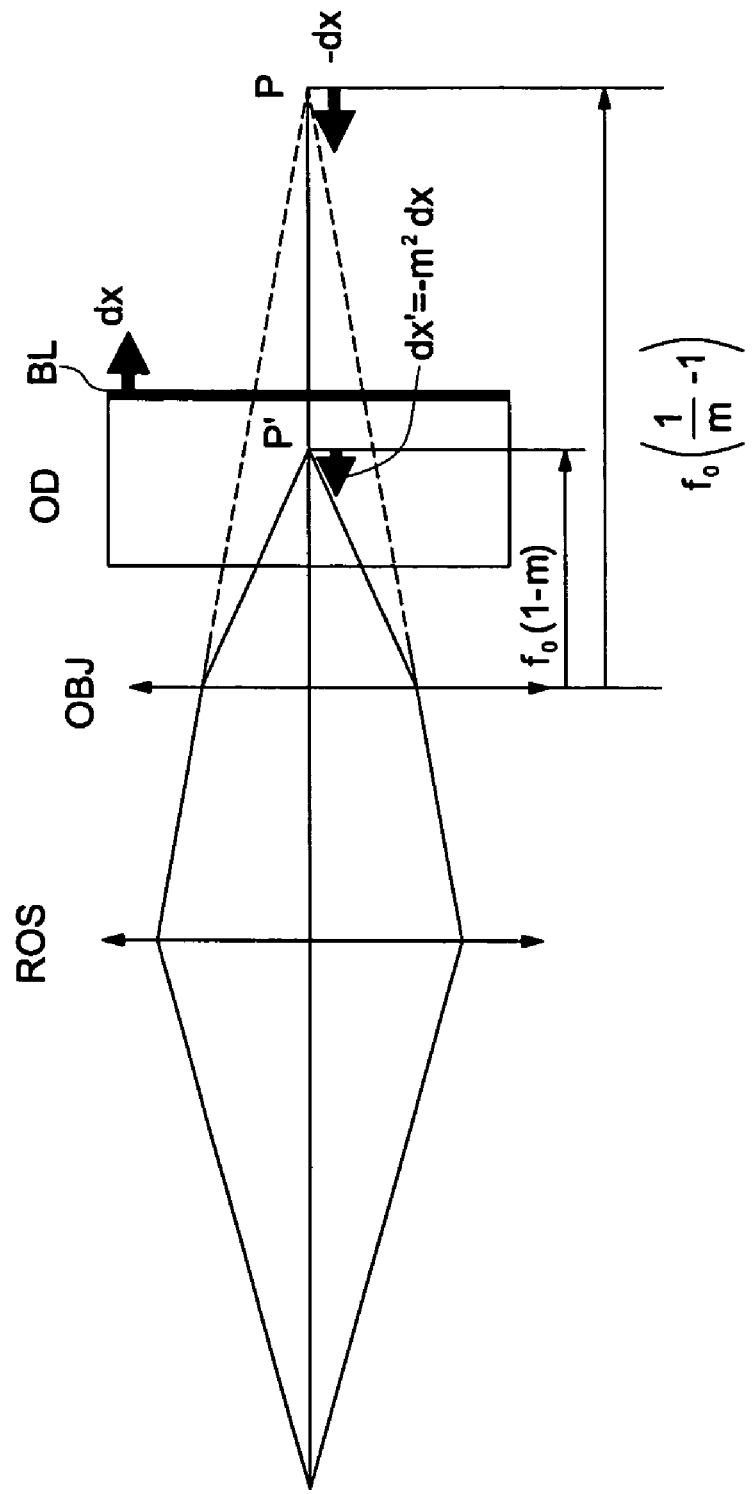
FIG. 7 illustrates a conception drawing explaining an occurrence of fluctuation in recording position due to the warp of an optical disc.

The calculation method of the above-mentioned drive amount in the embodiment will be described. FIG. 7 shows a schematic view in which only the objective lens OBJ, the optical disc OD, and the relay optical system ROS in FIG. 6 are illustrated. Defining that the focal length of the objective lens OBJ is f0 and the magnification of the objective lens OBJ when recording/reproducing information to the predetermined position is "m", the distance between object point P of a light flux entering the objective lens OBJ and the objective lens OBJ is expressed by $f0 \cdot (1/m-1)$, and the distance between image point P' and the objective lens OBJ is expressed by $f0 \cdot (1-m)$. In this case, when the optical disc OD is displaced by amount dx with rotation due to the warp of the optical disc itself, the objective lens OBJ also displaced by the same amount in order to keep the distance between the objective lens and the optical disc OD constant. Viewing this displacement from the objective lens OBJ, it looks as if the object point P would be relatively displaced by the amount dx toward the objective lens OBJ. Considering it with the magnification m, it means that the recording position shifts by $m^2 \cdot dx$ within an optical disc. This is considered to be a recording position error.

Figure 8:
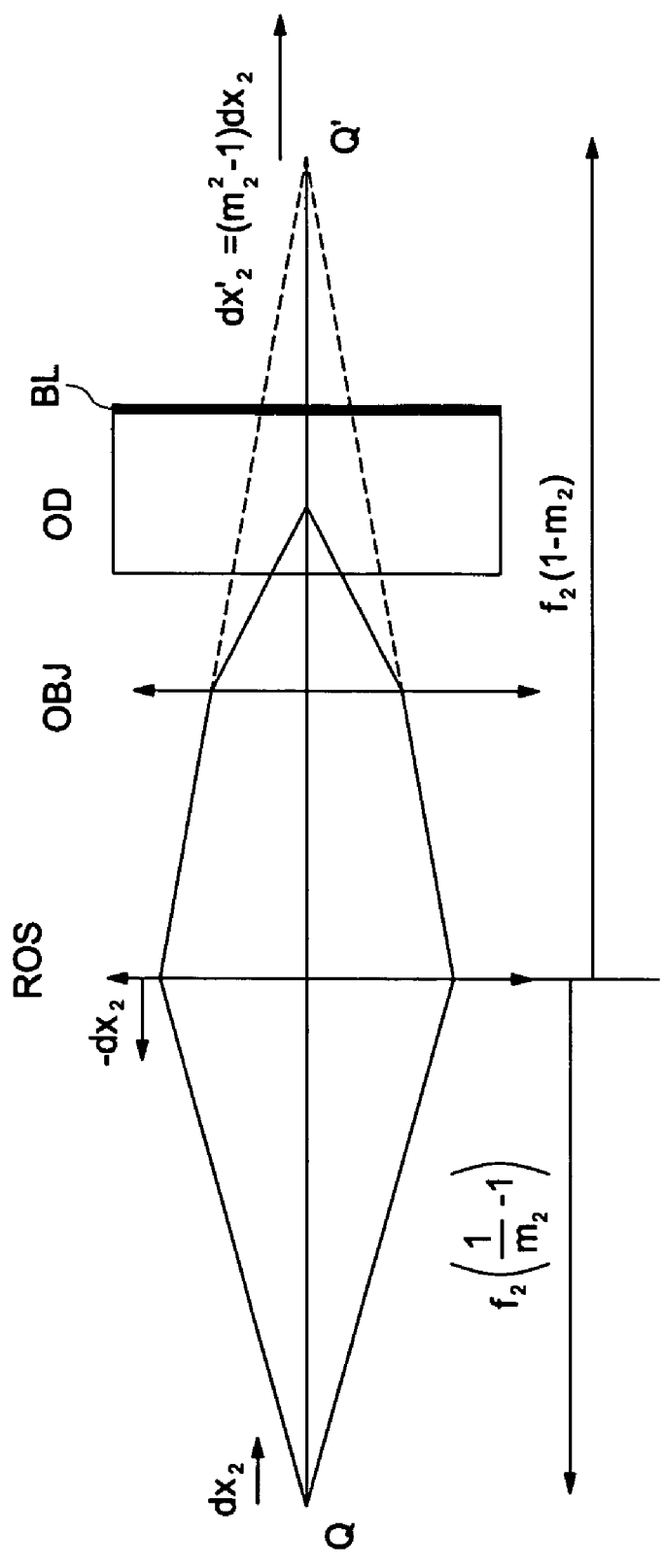
FIG. 8 illustrates a conception drawing explaining an occurrence of fluctuation in recording position due to a warp of an optical disc with tracking by a second actuator.

Then, the relay optical system ROS is displaced so as to correct the recording position error caused by the displacement dx of this optical disc OD. As shown in FIG. 8, defining that the focal length of the relay optical system ROS is f2 and the magnification of the relay optical system ROS is m2 at the time of recording information onto the predetermined position, the position of object point Q of relay optical system ROS and the position of image point Q' is expressed as $f2 \cdot (1/m2-1)$ and $f2*(1-m2)$, respectively. Under this definition, the relay optical system ROS is displaced in the direction of the object point to make the image point Q' go away from the objective lens OBJ. Defining the displacement amount of the relay optical system ROS as $-dx2$, where minus is shown based on the notation that dx2 is supposed to be positive and the direction which is away from the objective lens, displacement amount dx2' of the position of image point "Q'" can be written to be $(m2^2-1) \cdot dx2$. The relationship dx2'=dx should hold in order that the displacement amount dx2' and the displacement amount dx are canceled out. Therefore, the following relationship holds.

$$dx2 = dx/(m2^2-1) \approx dx/m2^2$$

When defining the following situation as a standard: the situation that the magnification of relay optical system ROS becomes infinite at the time of recording information on a standard recording position (represented as BL in FIG. 8) namely, the situation that a light source is put on the focal point of the relay optical system ROS, displacement amount x2 of the relay optical system at the magnification m2 can be expressed as $x2=f2/m2$, and the expression can also be expressed as $m2=f2/x2$. Accordingly, the following expression holds.

$$dx2 = (x2/f2)^2 \cdot dx$$

The amount dx2 is calculated by multiplying the displacement amount of the objective lens OBJ displaced for keeping a distance between the objective lens and the optical disc OD with a factor $(x2/f2)^2$, where the factor corresponds to the displacement amount x2 of the relay optical system ROS displaced for recording information on the predetermined recording position. When moving the relay optical system ROS by the displacement amount of dx2, the recording position error caused by fluctuation of the optical disc OD such as the warp can be corrected. In this correction, the factor $(x2/f2)^2$ has a positive value and the sign of dx2 is the same as dx, namely, dx2 and dx means displacements in the same direction. Accordingly, the second actuator displaces the relay optical system so as to track the objective lens in the direction of the optical axis. However, when the displace amount x2 of the relay optical system ROS is small compared with f2, the tracking actions of the relay optical system ROS can be omitted. Reduction of power dissipation is attained by making the relay optical system ROS track the objective lens the moment when the displace amount is above a certain level, and making the relay optical system ROS stand still when the displacement amount is not more than that.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein. For example, the present invention may be applied to the optical pickup apparatus, which is capable of recording and/or reproducing information onto or from a single kind of optical disc instead of a compatible type. Moreover, as for the detector, it is not limited to a mechanical type and an optical type. Particularly, the optical system used for recording/reproducing information for DVD can be applied to the detector to measure the distance between distance between the optical disc and the objective lens.

What is claimed is:

1. An optical pickup apparatus for recording and/or reproducing information on an optical disc in which information can be recorded at a plurality of recording positions each of which is located at a different distance from a surface of the optical disc, the optical pickup apparatus comprising:
    a light source for emitting a light flux;
    a relay optical system for receiving the light flux emitted from the light source;
    an objective lens for receiving the light flux emitted from the light source through the relay optical system and converging the light flux onto one of the plurality of recording positions;
    a photodetector for receiving a light flux emitted from the optical disc;
    a detector for detecting information for keeping a distance between the optical disc and the objective lens a predetermined value;
    a first actuator for driving the objective lens so as to displace the objective lens in a direction of an optical axis of the objective lens based on a signal from the detector, for keeping the distance between the optical disc and the objective lens the predetermined value irrespective of the plurality of recording positions; and
    a second actuator for driving the relay optical system so as to displace the relay optical system in a direction of an optical axis of the relay optical system, corresponding to one of the plurality of recording positions where information is recorded and/or reproduced.

2. The optical pickup apparatus of claim 1,
wherein the detector mechanically detects the information for keeping the distance between the optical disc and the objective lens the predetermined value.

3. The optical pickup apparatus of claim 1,
wherein the detector optically detects the information for keeping the distance between the optical disc and the objective lens the predetermined value.

4. The optical pickup apparatus of claim 1,
wherein the relay optical system comprises a single lens group or a plurality of lens groups, and
the second actuator drives a lens group arranged closest to the objective lens in the relay optical system in the direction of the optical axis of the relay optical system, corresponding to one of the plurality of recording positions where information is recorded and/or reproduced.

5. The optical pickup apparatus of claim 4,
wherein the optical pickup apparatus satisfies a following expression:

$$0.005 < (f0/f2)^2 < 0.25,$$

where $f0$ is a focal length of the objective lens, and
$f2$ is a focal length of the lens group arranged closest to the objective lens.

6. The optical pickup apparatus of claim 1,
wherein the relay optical system comprises, in order from the light source side,
   a collimating lens group having a positive refractive power for converting an incident light flux into a parallel light flux,
   a first lens group, and
   a second lens group having an opposite refractive power to the first lens group, and
wherein the second actuator moves the first lens group in a direction such that the first lens group goes away from the objective lens to change a recording position in a direction from a rear side to a front side of the optical disc, when the second actuator move only the first lens group in the relay optical system in the direction of the optical axis of the relay optical system,
the second actuator moves the second lens group in a direction such that the second lens group goes closer to the objective lens to change a recording position in a direction from the rear side to the front side of the optical disc, when the second actuator moves only the second lens group in the relay optical system in the direction of the optical axis of the relay optical system.

7. The optical pickup apparatus of claim 6,
wherein the optical pickup apparatus satisfies a following expression:

$$0.005 < (f0/f2)^2 < 0.25,$$

where $f0$ is a focal length of the objective lens, and
$f2$ is a focal length of the lens group arranged closest to the objective lens.

8. The optical pickup apparatus of claim 6,
wherein the first lens group has a negative refractive power, the second lens group has a positive refractive power,
an air-equivalent length between a first principal point of the objective lens and a second principal point of the second lens group is almost $f0+f2$, the air-equivalent length being obtained by substituting an air space for a whole of optical elements arranged between the first principal point of the objective lens and the second principal point of the second lens group,
where $f0$ is a focal length of the objective lens, and
$f2$ is a focal length of the lens group arranged closest to the objective lens, and
the second actuator moves only the first lens group in the relay optical system in the direction of the optical axis of the relay optical system for recording and/or reproducing information.

9. The optical pickup apparatus of claim 1,
wherein the second actuator drives the relay optical system so as to displace the relay optical system in the direction of the optical axis of the relay optical system, corresponding to one of the plurality of recording positions where information is recorded and/or reproduced, and
when information is recorded and/or reproduced on one of the plurality of recording positions,
the first actuator drives the objective lens so as to displace the objective lens in the direction of the optical axis of the objective lens based on the signal from the detector for keeping the distance between the optical disc and the objective lens the predetermined value, and the second actuator drives the relay optical system to displace the relay optical system in the optical axis of the relay optical system so as to track the objective lens based on a displacement amount of the objective lens and a displacement amount of the relay optical system by the second actuator corresponding to one of the plurality of recording positions.

10. The optical pickup apparatus of claim 9,
wherein the second actuator drives the relay optical system with being accompanied by a movement of the objective lens, the second actuator driving the relay optical system so as to displace the relay optical system by a amount which is proportional to a square of a displacement amount of the relay optical system for changing the recording positions compared with a position of the relay optical system for recording information on a predetermined standard recording position and is proportional to the displacement amount of the objective lens compared with a position of the objective lens for recording information on the predetermined standard recording position.

11. The optical pickup apparatus of claim 9,
wherein a displacement amount of the relay optical system based on the displacement amount of the objective lens and on the displacement amount of the relay optical system by the second actuator corresponding to one of the plurality of recording positions, is smaller than a displacement amount of the relay optical system corresponding to one of the plurality of recording positions.

* * * * *